(12) United States Patent
Panero et al.

(10) Patent No.: US 12,511,295 B2
(45) Date of Patent: Dec. 30, 2025

(54) METHOD AND SYSTEM FOR DYNAMIC EXPOSITION OF MANUFACTURING OPERATION DATA FROM A DATA WAREHOUSE

(71) Applicant: Siemens Aktiengesellschaft, Munich (DE)

(72) Inventors: Fabio Panero, Genoa (IT); Matteo Gentile, Genoa (IT); Alessio Dellacha', Genoa (IT); Alessio Mura, Genoa (IT); Stefano Rulli, Genoa (IT); Gabriele De Maglie, Serra Ricco (IT)

(73) Assignee: Siemens Aktiengesellschaft, Munich (DE)

( * ) Notice: Subject to any disclaimer, the term of this patent is extended or adjusted under 35 U.S.C. 154(b) by 127 days.

(21) Appl. No.: 18/499,394

(22) Filed: Nov. 1, 2023

(65) Prior Publication Data

US 2024/0143618 A1 May 2, 2024

(30) Foreign Application Priority Data

Nov. 1, 2022 (EP) .................................. 22204842

(51) Int. Cl.
*G06F 16/2455* (2019.01)
*G06F 16/21* (2019.01)
(Continued)

(52) U.S. Cl.
CPC ...... *G06F 16/24568* (2019.01); *G06F 16/213* (2019.01); *G06F 16/288* (2019.01); *G06Q 50/04* (2013.01)

(58) Field of Classification Search
CPC ............. G06F 16/213; G06F 16/24568; G06F 16/288; G06Q 50/04
See application file for complete search history.

(56) References Cited

U.S. PATENT DOCUMENTS

2014/0101635 A1* 4/2014 Hoffmann ................. G06F 8/30
717/106

FOREIGN PATENT DOCUMENTS

WO    WO 2019/005309 A1    1/2019

OTHER PUBLICATIONS

Dykstra et al., "Tutorial: Get Started with Entity Framework 6 Code First using MVC 5", Sep. 29, 2022, https://learn.microsoft.com/en-us/aspnet/mvc/overview/getting-started/getting-started-with-ef-using-mvc/creating-an-entity-framework-data-model-for-an-asp-net-mvc-application. (Year: 2022).*

(Continued)

*Primary Examiner* — Jay A Morrison
(74) *Attorney, Agent, or Firm* — Laurence A. Greenberg; Werner H. Stemer; Ralph E. Locher

(57) ABSTRACT

A method and a system perform dynamic exposition of data from a data repository. The method includes the steps of: providing one or more data model entities relevant to the data to be exposed; creating a controller for the or each data model entity; compiling the or each controller thereby creating a respective artifact; and processing the artifact(s) to obtain the data exposition at a data exposition host. The step of providing at least one data model entity includes creating a logical, human-readable representation of the data model (e.g. a metamodel), and the steps of creating and compiling the or each controller and creating and processing the artifact(s) are automatically performed starting from the metamodel(s) when a user modifies the latter and requests data exposition.

8 Claims, 3 Drawing Sheets

(51) Int. Cl.
*G06F 16/28* (2019.01)
*G06Q 50/04* (2012.01)

(56) References Cited

OTHER PUBLICATIONS

Freeman, "Essential Docker for ASP.NET Core MVC", 2017, Apress, ISBN-13 (pbk): 978-1-4842-2777-0. (Year: 2017).*
Patel et al., "Code First Migrations", Oct. 14, 2020, https://learn.microsoft.com/en-us/ef/ef6/modeling/code-first/migrations/. (Year: 2020).*
Manticore: "Representational state transfer", Dec. 22, 2021 (Dec. 22, 2021), pp. 1-8, XP093029085, Retrieved from the Internet: URL:https://en.wikipedia.org/w/index.php?title=Representational_state_transfer&oldid=1061546158.
Anonymous: "Continuous delivery", Apr. 4, 2022, pp. 1-6, XP093029301, Retrieved from the Internet: URL:https://en.wikipedia.org/w/index.php?title=Continuous_delivery&oldid=1080945954.
Somers-All-The-Time: "Open Container Initiative", Sep. 23, 2022 (Sep. 23, 2022), pp. 1-1, XP093029296, Retrieved from the Internet: URL:https://en.wikipedia.org/w/index.php?title=Open_Container_Initiative&oldid=1111903333.

* cited by examiner

METHOD AND SYSTEM FOR DYNAMIC EXPOSITION OF MANUFACTURING OPERATION DATA FROM A DATA WAREHOUSE

CROSS-REFERENCE TO RELATED APPLICATION

This application claims the priority, under 35 U.S.C. § 119, of European Patent Application EP 22204842.3, filed Nov. 1, 2022; the prior application is herewith incorporated by reference in its entirety.

FIELD AND BACKGROUND OF THE INVENTION

The invention relates to digital manufacturing (DM) and, more particularly, it concerns a method and a system for dynamic exposition of manufacturing operation data from an enterprise data warehouse, i.e. from a central repository of the enterprise data.

As known, digital manufacturing is the use of an integrated, computer-based system comprised of simulation, 3D visualization, analytics and collaboration tools to create product and manufacturing process definitions simultaneously. A key role in DM is played by data analysis, based on which the manufacturers can take the proper decisions in a short time. To carry out such analysis and expose the results, the users often have to create specific applications. To do this, they must access their data contained inside data-marts (i.e. subsets of the data warehouse containing the data relevant to specific business lines or teams), called "smart-views", which users can create and edit at their will.

Of course, in a DM environment, the users desire to expose data from the data-marts in a compatible form with the existing business intelligence (BI) tools, ensuring performance and security standards. Moreover, they need to ensure service continuity during the create/edit operations performed over the data-marts.

A naive solution to the problem, enabling users to see changes made to the database model, could be direct exposition of the database. This solution is not acceptable due to data security concerns.

A possible solution using software techniques currently employed in BI, such as the REST (REpresentational State Transfer) architectures, could be to manually create a REST endpoint to expose data from the data-marts. A schematic representation of this solution is illustrated in the pictogram of FIG. 1.

In FIG. 1, icon DB represents a data repository (e.g. an enterprise data warehouse) containing the data to be exposed, and icon DA represents the dashboards created by the user, at which the results of the desired analysis are exposed. By way of example, it is assumed that data repository DB is a relational database where the data are structured according to entities, attributes and relationships, as known to the persons skilled in the art. Icons D in the shape of small human chest symbolize the work of the user's technical staff (e.g. developers), and icon EU in the shape of a larger human chest symbolizes the end user, i.e. the person entrusted with the manipulation of the data exposed for carrying out the desired analyses thereon. Moreover, black arrows represent operations carried out during the process for arriving at data exposition (pipeline), and white arrows represent the workflow at runtime.

The known process substantially includes the following steps:

1. a developer D, starting from the data models of interest for the specific exposition (which are known to him/her), creates a number of controllers (one controller creation and creates artifact(s) AF containing the controller logic; for each model entity), i.e. he/she writes the program codes necessary for accessing the data. The whole of the model entities and the respective controllers is denoted MC;
2. developer D compiles the code(s) written for controller creation and creates artifact(s) AF containing the controller logic;
3. developer D then distributes artifacts AF by running them in an environment where they have to manage the necessary configurations (e.g. database access credentials); the artifacts are then passed to data exposition host DEH (that is, to the REST endpoint) for publication. By way of example, data exposition can take place by using the Open Data Protocol (OData), which is the subject matter of ISO/IEC standards 20802-1:2016 and 20802-2:2016;
4. end user EU can now interact with data exposition host DEH and access the data to carry out the desired analyses and build her/his own dashboards.

At this point, as long as no modification of the data exposition is required (runtime operation), data exposition host DEH will directly interact with database DB for accessing the data and will present the data to end user EU without the need of interventions of the technical staff.

The technical staff is again involved when end user EU needs to modify the models by adding/modifying/deleting one or more entities or relationships, e.g. because of new requirements from a business line. In such case, developer D has to carry out the corresponding modifications in database DB and then to repeat steps 1 to 3 described above.

This solution has a number of drawbacks, the major of which is that every time a change occurs in the data-mart models an intervention on database DB is required and the whole process has to be repeated by developer D in order to update the exposition, as stated above. This is obviously time-consuming and error-prone. A direct consequence is that the new intervention of developer D adds to the costs of the procedure.

Another serious drawback is that, at the conclusion of each update, the procedure entails a service downtime for maintenance purposes, during which the newly developed solution is published.

The need for a new intervention of the developer obviously also introduces a delay between the arrival of new data in the data source and their availability to the end user.

SUMMARY OF THE INVENTION

It is therefore an object of the present invention to overcome the above-mentioned drawbacks of the prior art, by providing a method and a system for dynamic exposition of manufacturing operation data from a data warehouse that enable updating data exposition, upon a change in a data model, without the need to repeat the process leading to the exposition.

The aforementioned aims are achieved by a method for dynamic exposition of data from a data repository, in particular manufacturing operation data from an enterprise data warehouse, including the steps of:

providing one or more data model entities relevant to the data to be exposed;

creating a controller for the or each data model entity;
compiling the or each controller and creating a respective artifact, and
processing the artifact(s) to obtain the data exposition at a data exposition host;
wherein the step of providing at least one data model entity includes creating a logical, human-readable representation of the or each data model ("metamodel"), and the steps of creating and compiling the or each controller and creating and processing the artifact(s) are automatically performed starting from the metamodel(s) when a user modifies the latter and requests the data exposition.

In invention embodiments, the method further includes, before the step of creating the controller(s), the steps of reading the modified metamodel and updating the data repository so as to bring it in line with the metamodel. These steps are started by the user's request for data exposition.

In invention embodiments, the step of creating the or each model controller includes:
 extracting all entities and relationships from the respective metamodel;
 writing the corresponding classes, one for each entity;
 mapping the classes to the data repository; and
 generating a controller code for the or each model entity and creating the surfing path(s) therefor.

In invention embodiments, the step of processing the artifact(s) includes:
 loading the artifact(s) into the data exposition host;
 creating and publishing an Open Container Initiative (OCI) image, containing the data exposition host comprised of the artifact(s); and
 executing the OCI image and running the data exposition host.

In invention embodiments, the steps of creating and executing the OCI image and running the data exposition host are performed by using a zero-downtime deployment technique.

In invention embodiments, the following operations are performed at each access of the user to a metamodel:
 checking whether the entities and/or relationships necessary for the requested exposition are defined in the corresponding data model and, if necessary, adding/modifying/deleting one or more entities and/or relationships by writing (a) corresponding statement(s) in the metamodel;
 checking the correctness of the statement(s) and, in the affirmative, simulating the outcome of the statement(s);
 checking whether the outcome is the desired one and, in the affirmative, requesting the data exposition.

In invention embodiments, in case of a negative result of any of the checks on the statement correctness and outcome, the statement is modified and the operations are resumed from the check on the statement correctness.

In invention embodiments, the method results in the automatic creation of a REST (REpresentational State Transfer) endpoint.

In invention embodiments, the data exposition is preferably carried out by using the Open Data protocol.

In invention embodiments, the user can autonomously modify the data model and add custom entities and functions or modify existing entities and functions by simply writing corresponding statements in the metamodel, without directly accessing the database.

In invention embodiments, no manual, error-prone code developing is required and the generation and processing of the necessary codes (i.e. the generation of model controllers and artifacts) takes place automatically.

In invention embodiments, the modifications are dynamically loaded, thereby avoiding any downtime.

Furthermore, a system for dynamic exposition of data from a data repository can be provided, containing data processing means configured to execute the steps of the method defined above.

In invention embodiments, the data processing means are associated with means for generating the metamodel(s).

In invention embodiments, the data processing means are further associated with means for enabling the user to display data obtained through the data exposition.

Still further, a computer program product stored on a computer readable medium can be provided, comprising computer program code for causing a data processing system to perform the method defined above when the product is loaded into a memory of the data processing system and run in a processor of the data processing system.

Additionally, a computer program element can be provided, containing computer program code for performing steps according to the above mentioned method when loaded in a digital processor of a computing device.

Other features which are considered as characteristic for the invention are set forth in the appended claims.

Although the invention is illustrated and described herein as embodied in a method and a system for dynamic exposition of manufacturing operation data from a data warehouse, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Elements having the same or equivalent functionalities in the different Figures are denoted by the same reference symbols or icons.

Figure 1:
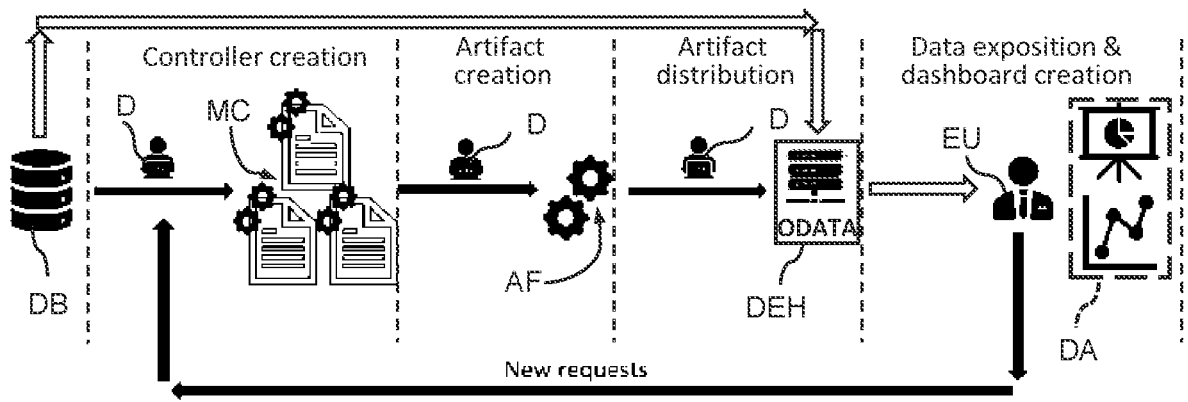
FIG. 1 is a pictogram illustrating a data exposition method according to a conventional solution.
Figure 2:
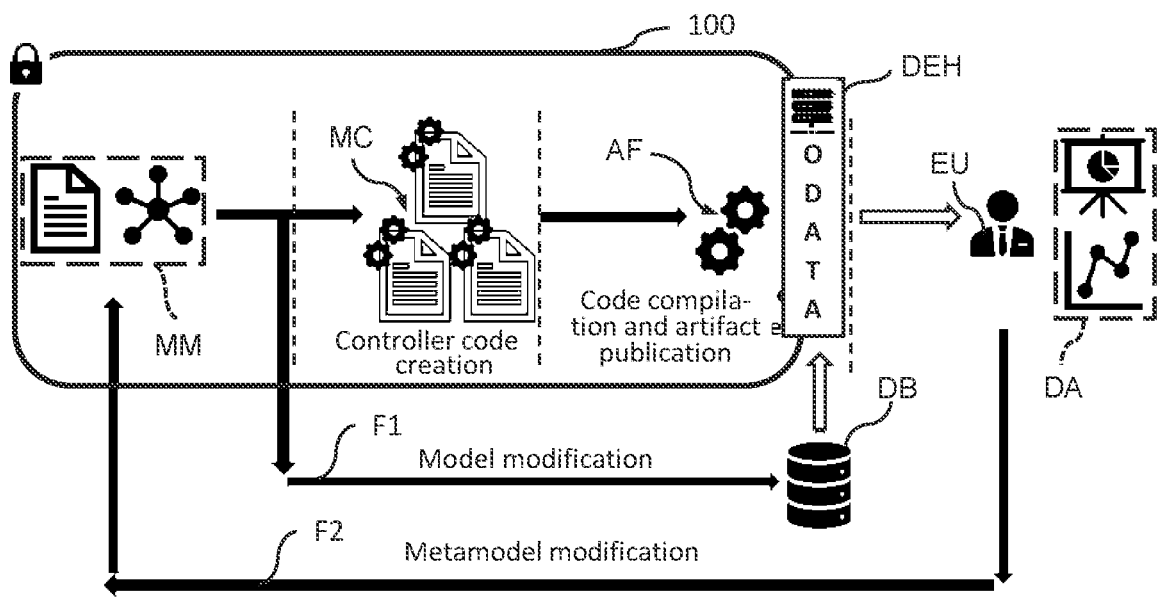
FIG. 2 is a pictogram illustrating the data exposition method according to the invention.

Referring now to the figures of the drawings in detail and first, particularly to FIG. 2 thereof, which in contrast with the solution shown in FIG. 1, shows that the invention provides an integrated or closed system, as symbolized by box 100 with the padlock, where the data exposition process is configurable from the outside, without end user EU having to go into the process itself.

In the invention, the process starts from a metamodel MM, i.e. from a logical, human-readable representation of the data model. Through metamodel MM, end user EU may know and autonomously modify the data model, without interventions of the technical staff, as indicated by path F1. Metamodel MM can be created from scratch or supplied out of the box by a suitable product. Products for this purpose are commercially available, an example being Opcenter Intelligence of Siemens Industry Software S.r.l. The creation of metamodel MM is not part of the invention and will not be discussed in detail.

Starting from the metamodel, the process pipeline is run and automatically generates the controller codes MC, compiles them in order to create artifacts AF and publishes them on data exposition host DEH, thereby providing a data exposition, preferably according to OData protocol, ready for use.

Figure 3:
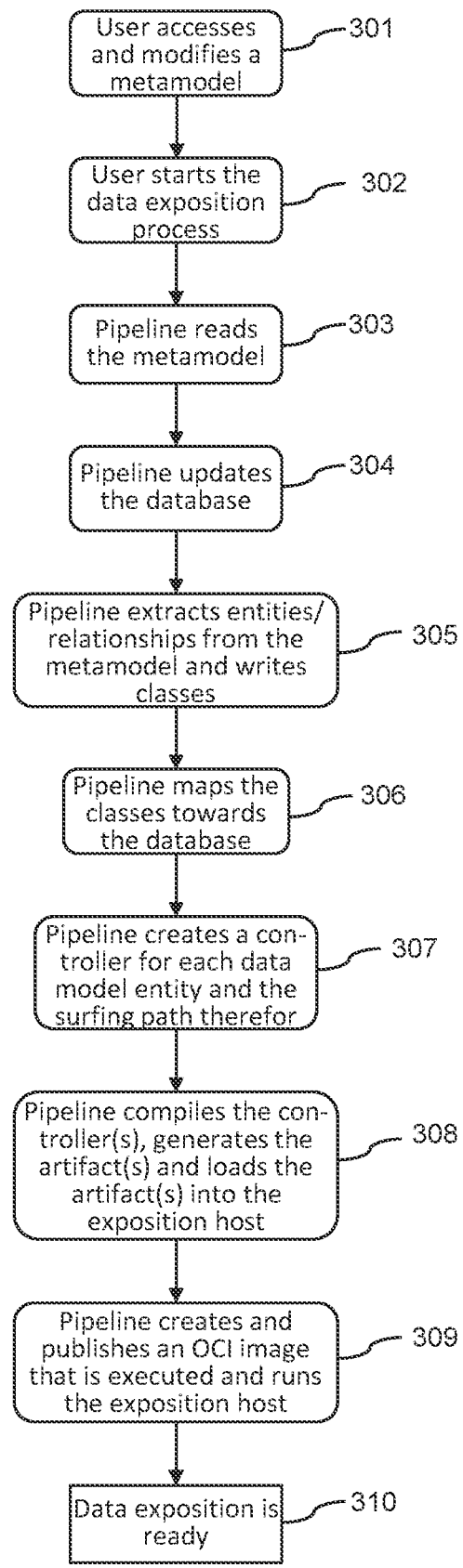
FIG. 3 is a flow chart illustrating the data exposition method according to the invention in more detail.

The method of the invention will now be disclosed in more detail with reference also to the flow chart of FIG. 3.

The operations start when end user EU accesses metamodel MM in order to modify it (step 301). Once the user has carried out all desired modifications and decides to proceed to the data exposition (step 302), metamodel MM is read by the pipeline (step 303) that updates database DB (path F2 in FIG. 2, step 304 in FIG. 3) by adding or removing or modifying entities, attributes and relationships. At the end of this step, database DB mirrors what is described in metamodel MM.

The subsequent step is the extraction of all entities and relationships present in metamodel MM and the writing of the corresponding classes by the pipeline (step 305). As known, a class is a code portion representing an entity. A class for each entity to be represented is generated. The pipeline now creates the mapping of the classes towards relational database DB (step 306) in the form of a link between a database table and a class, and then creates the controllers for each of the existing data model entities and the surfing paths therefor as demanded by Odata protocol (step 307). Steps 305 to 307 are all included in the phase of controller code creation in FIG. 2.

At this point, the pipeline compiles the codes generated until that moment, thereby obtaining artifacts AF that are loaded into data exposition host DEH (step 308). Then an OCI (Open Container Initiative) image is created that contains data exposition host DEH filled with artifacts AF (step 309). In the same step 309, the OCI image is executed and runs data exposition host DEH. More information about OCI images is available at the site https://opencontainers.org.

The creation and publication of the OCI image takes place by using a zero-downtime deployment technique, e.g. Blue-Green deployment. Zero-downtime deployment is a concept well known to the persons skilled in the art. The data exposition is now ready and the pipeline ends (310).

Starting from the OData exposition, end user EU can then create its dashboard(s) DA. To this aim, use can be made of a platform for low-code or no-code generation of front-end applications. An example is the Mendix platform commercialized by Siemens AG. This latter step is not part of the invention and will not be discussed in detail. For the same reason, it is not included in the flow chart.

The closed system, which does not require manual creation of controllers and artifacts, greatly simplifies and speeds up the update of a data model for coping with new requirements. By using the metamodel, end user EU can e.g. extend the model by adding custom entities and functions by simply writing the statement(s) that describe(s) these new entities and functions. Moreover, to increase user autonomy, the solution allows user EU to check immediately the correctness of the new statement(s).

Figure 4:
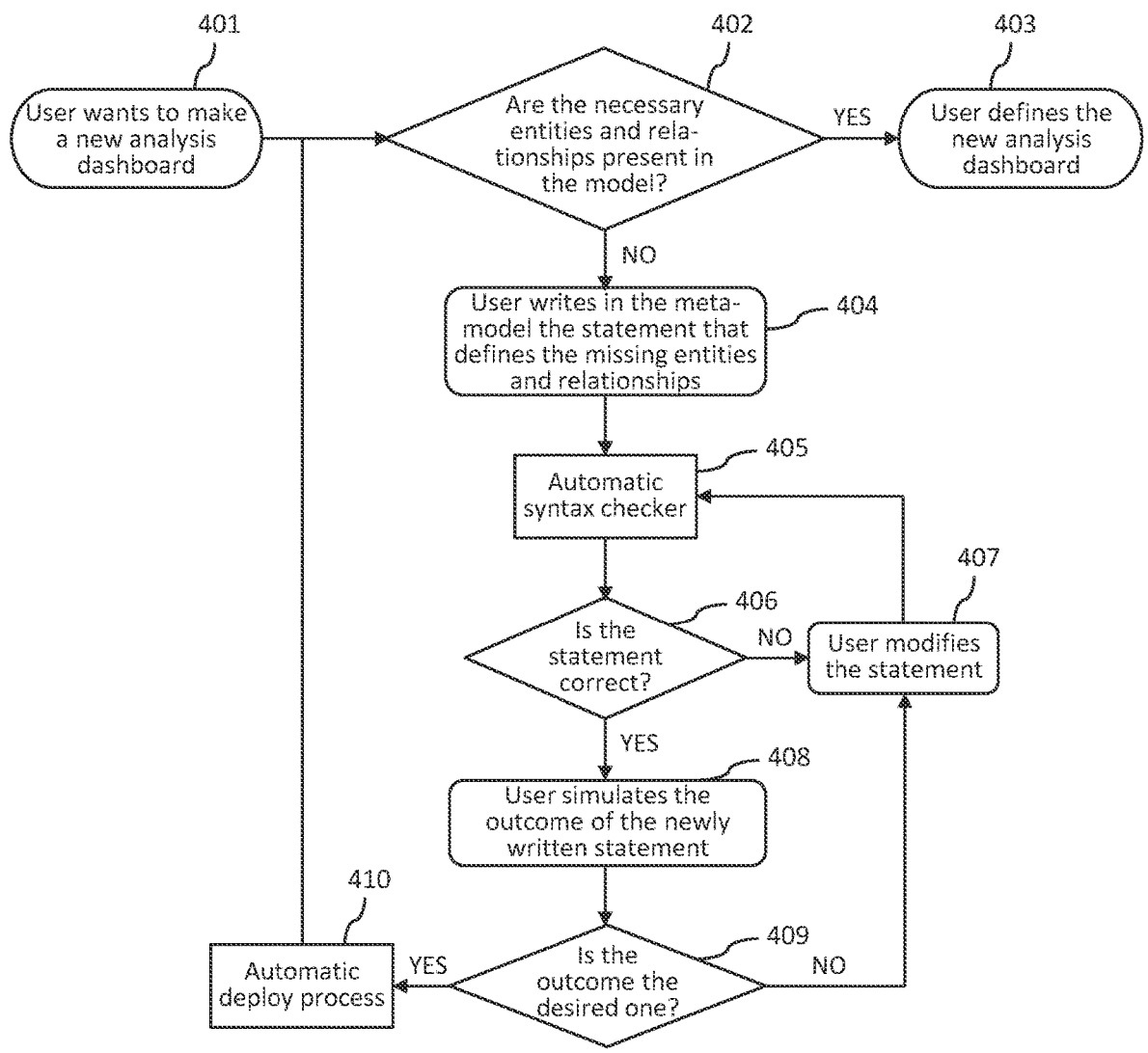
FIG. 4 is a flow chart illustrating the interaction of a user with a system according to the invention for updating a data exposition.

The interaction of user EU with the system of FIG. 2 for updating a data exposition is now disclosed with reference to the flow chart of FIG. 4. For the sake of simplicity and clarity of the description, the flow chart assumes that a new dashboard is required since new data have been loaded into data warehouse DB and hence the model is to be extended. On the other hand, this is the most frequent case. At any rate, the person skilled in the art has no problem in adapting the description below to any other kind of modification of the data model.

The initial step 401 is just the need or the wish to make a new analysis dashboard to take such new data into account. When this occurs, user EU checks (step 402), by using metamodel MM (FIG. 2), whether the data model to be acted upon already contains the necessary entities and relationships. In the affirmative, user EU defines the new analysis dashboard (step 403) and the process passes to the runtime phase. In the negative, user EU extends the model by writing into metamodel MM the statement(s) defining the missing entities and relationships (step 404). The extended model is then passed to an automatic syntax checker provided for by the system (step 405) for a check on the formal correctness of the statement (step 406). If the statement is not correct, user EU modifies it (step 407) and passes again the modified statement to the syntax checker for a new check. If or when the check on the statement correctness is successful, user EU simulates the outcome of the statement itself (step 408) and checks whether the outcome is the desired one (step 409). In the affirmative, user EU starts a deployment process (step 410) for the particular model, that is, user EU starts the implementation of the method illustrated in FIGS. 2 and 3. Step 410 thus corresponds to step 302 in FIG. 3. The process then returns to step 402 for the update of another model. In the negative, user EU modifies the statement (step 407) as in the case of negative outcome of the correctness check of step 406 and the process is resumed from step 405.

The above description clearly shows that the invention attains the aims set forth above.

The use of the human-readable metamodel allows user EU to modify autonomously the data model, by simply adding custom entities and functions or modifying existing entities and functions, what also increases the flexibility of the data exposition process. Moreover, data model modification does not entail a direct access of the user to the database since the modifications to the database are automatically performed by the system, what increases data security.

Moreover, generation and processing of the necessary codes (generation of model controllers and artifacts) takes place automatically, thereby avoiding manual, error-prone developing.

Furthermore, the modifications are dynamically loaded, thereby avoiding any downtime.

In addition to the embodiment of the present invention described above, the persons skilled in the art will be able to arrive at a variety of other arrangements and steps, which, if not explicitly described in this document, nevertheless fall within the scope of the appended claims.

For example, even if use of OData protocol for data exposition is the preferred solution, an alternative could be using GraphQL language. Such language too is well known to the persons skilled in the art.

The invention claimed is:
1. A method for dynamic exposition of data from a data repository, which comprises the steps of:
provided at least one data model entity relevant to the data to be exposed by creating a logical, human- readable representation of the at least one data model entity, hereinafter referred to as a metamodel;

creating a controller for the at least one data model entity;

compiling the controller and creating a respective artifact;

processing the respective artifact to obtain a data exposition at a data exposition host, the steps of creating and compiling the controller and creating and processing the respective artifact are automatically performed starting from the metamodel when a user modifies the metamodel and requests the data exposition; and before performing the steps of creating the controller and compiling the controller, performing the following operations at each access of the user to the metamodel:

checking whether entities and/or relationships necessary for a requested exposition are defined in a corresponding data model and, if necessary, adding/modifying/deleting at least one of the entities and/or relationships by writing a corresponding statement in the metamodel, automatically, with a syntax checker, checking a correctness of the corresponding statement and, in an affirmative, simulating an outcome of the corresponding statement, and checking whether the outcome is a desired one and, in an affirmative, requesting the data exposition.

2. The method according to claim 1, wherein before performing the step of creating the controller, performing a reading of a modified metamodel and updating the data repository so as to bring it in line with the metamodel, these steps being started by a request of the user for the data exposition.

3. The method according to claim 1, wherein the step of creating the controller includes the substeps of:

extracting all entities and relationships from the metamodel;

writing corresponding classes, one for each entity;

mapping the classes to the data repository; and generating controller code for the at least one model entity and creating a surfing path therefor.

4. The method according to claim 1, wherein the step of processing the respective artifact includes the substeps of:

loading the respective artifact into the data exposition host;

creating an open container initiative (OCI) image containing the data exposition host comprised of artifacts; and executing the OCI image and running the data exposition host.

5. The method according to claim 4, wherein the steps of creating and executing the OCI image and running the data exposition host are performed by using a zero-downtime deployment technique.

6. The method according to claim 1, wherein in case of a negative result of any of the checking steps on the correctness and the outcome of the corresponding statement, the corresponding statement is modified and operations are resumed from a check on the statement correctness.

7. A system for dynamic exposition of data from a data repository, comprising:

a data processor configured to execute the method according to claim 1.

8. A non-transitory computer readable medium containing a computer program product having computer-executable program code for causing a data processing system to perform the method according to claim 1 when the computer program product is loaded into a memory of the data processing system and run in a processor of the data processing system.

* * * * *